United States Patent
Rose (10) Patent No.: US 7,916,668 B2
(45) Date of Patent: Mar. 29, 2011

(54) SPANNING TREE PROTOCOL WITH BURST AVOIDANCE

(75) Inventor: Laurence Rose, Oak Park, CA (US)

(73) Assignee: Alcatel Lucent, Paris (FR)

( * ) Notice: Subject to any disclaimer, the term of this patent is extended or adjusted under 35 U.S.C. 154(b) by 527 days.

(21) Appl. No.: 11/028,355

(22) Filed: Dec. 30, 2004

(65) Prior Publication Data

US 2006/0146845 A1 Jul. 6, 2006

(51) Int. Cl.
H04L 12/28 (2006.01)

(52) U.S. Cl. ......... 370/256; 370/223; 370/254; 370/401

(58) Field of Classification Search .................. 370/423, 370/235, 256, 254, 223
See application file for complete search history.

(56) References Cited

U.S. PATENT DOCUMENTS

| | | | | |
|---|---|---|---|---|
| 6,032,194 A * | 2/2000 | Gai et al. | ....................... | 709/239 |
| 6,219,739 B1 * | 4/2001 | Dutt et al. | ..................... | 710/311 |
| 6,330,229 B1 * | 12/2001 | Jain et al. | ..................... | 370/256 |
| 6,535,490 B1 * | 3/2003 | Jain | ............................... | 370/256 |
| 6,898,189 B1 * | 5/2005 | Di Benedetto et al. | ........ | 370/256 |
| 6,976,088 B1 * | 12/2005 | Gai et al. | ..................... | 709/238 |
| 7,136,390 B2 * | 11/2006 | Kitagawa | ..................... | 370/401 |
| 7,177,946 B1 * | 2/2007 | Kaluve et al. | ................. | 709/242 |
| 7,379,429 B1 * | 5/2008 | Thottakkara | ................. | 370/256 |
| 7,564,779 B2 * | 7/2009 | Rose et al. | ..................... | 370/223 |
| 2002/0052936 A1 | 5/2002 | Gai et al. | | |
| 2004/0105455 A1 * | 6/2004 | Seaman | ........................ | 370/423 |
| 2005/0237943 A1 * | 10/2005 | Sasagawa | ....................... | 370/242 |

OTHER PUBLICATIONS

IEE Computer Society; "Part 3: Media Access Control (MAC) Bridges-Amendment2: Rapid Reconfiguration"; p. 24-76.*
IEEE Computer Society: "IEEE Std 802.1w Media Access Control (MAC) Bridges Amendment 2 : Rapid Reconfiguration" [Online] Oct. 25, 2001, IEEE Computer Society , XP002367326 IEEE Retrieved from the Internet: URL:http://ieeexplore.ieee.org/iel5/7525/2 0482/00946612.pdf?isnumber=20482&prod=STD&arnumber=946612&arSt=&ared=&arAuthor=> [retrieved on Feb. 9, 2006] Chapter 17.
IEEE: "IEEE Std 802.1D-2004, IEEE Standard for Local and metropolitan area networks—Media Access Control (MAC) Bridges" IEEE STD 802.1D-2004, XX XX, Jun. 9, 2004, pp. 1-2,29, XP002353250.

* cited by examiner

*Primary Examiner* — Ricky Ngo
*Assistant Examiner* — Dewanda Samuel
(74) *Attorney, Agent, or Firm* — RG & Associates (57) ABSTRACT

An apparatus and method for controlling bridge protocol data unit bursts is disclosed. The invention in the preferred embodiment is a switching device with a port enabled with a link management protocol and a burst control state machine. The burst control state machine is adapted to receive BPDUs and, under certain conditions, delay responding with its own BPDU falsely advertising itself as the new root bridge. The delay is preferably long enough to enable another bridge to identity the true root bridge. The delay, e.g., a burst control delay, is preferably equal to or less than a Hello time timer value generally defined to be 2 seconds in a Rapid Spanning Tree Protocol standard, for example.

14 Claims, 8 Drawing Sheets

```
┌─────────────────────────────────────────┐
│        UPDATE              402          │
├─────────────────────────────────────────┤
│                                         │
│      proposing = proposed = FALSE       │
│   agreed = agreed && betterorsameInfo() │
│         synced =synced && agreed        │
│     PortPriority = DesignatedPriority   │
│       PortTimes = DesignatedTimes       │
│            updtInfo = FALSE             │
│               infoIs = Mine             │
│             newInfo = TRUE              │
│                                         │
└─────────────────────────────────────────┘
```

FIG. 6 (PRIOR ART)

```
┌─────────────────────────────────────────┐
│    UPDATE_BURST_AVOID       502         │
├─────────────────────────────────────────┤
│                                         │
│      proposing = proposed = FALSE       │
│   agreed = agreed && betterorsameInfo() │
│         synced =synced && agreed        │
│     PortPriority = DesignatedPriority   │
│       PortTimes = DesignatedTimes       │
│            updtInfo = FALSE             │
│               infoIs = Mine             │
│            ~~newInfo = TRUE~~           │
│                                         │
└─────────────────────────────────────────┘
```

SPANNING TREE PROTOCOL WITH BURST AVOIDANCE

TECHNICAL FIELD

The invention generally relates to bridge or like device adapted to avoid bursts of bridge protocol data units in a data communications network. In particular, the invention relates to a system and method for limiting the conditions under which bridge protocol data units are transmitted to prevent the propagation of erroneous information regarding the identity of a root bridge.

BACKGROUND

Figure 1:
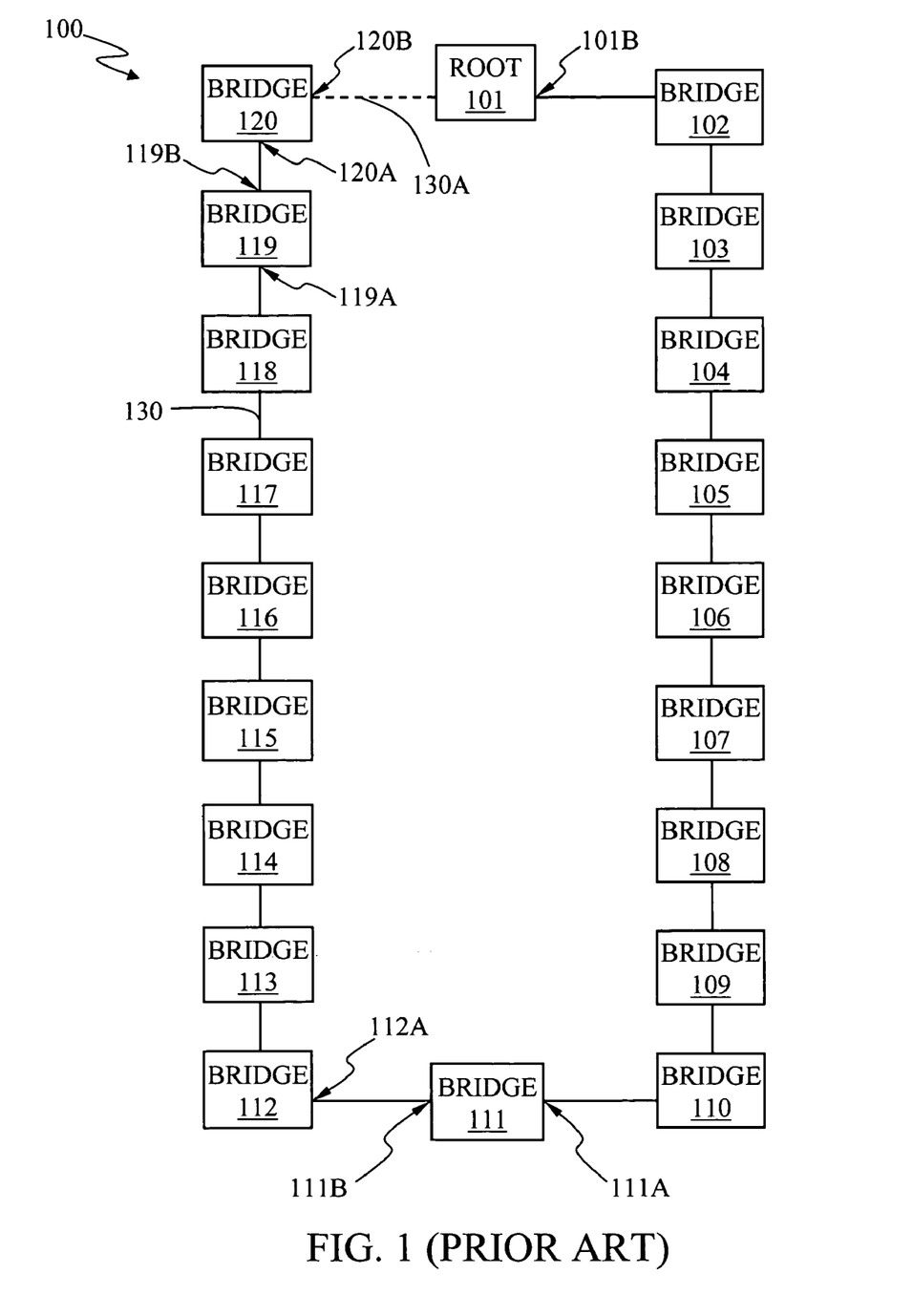
FIG. 1 is a data communications network including a plurality of bridge enabled with the spanning tree protocol (STP)

Illustrated in FIG. 1 is a data communications network 100 including a plurality of bridges 101-120 operatively coupled in the form of a ring by network links 130. The topology of the network 100 is useful to understand the drawbacks attributable to the prior art as well as the advantages of the present invention discussed in more detailed below. Each of the bridges 101-120 includes a plurality of network ports enabled with a link management protocol to resolve transmission loops in the network 100 that can give rise to broadcast storms. The link management protocol may be selected, for example, from the group comprising the Spanning Tree Protocol (STP) standardized in International Electrical and Electronics Engineers (IEEE) standard 802.1D 2004, the Rapid Spanning Tree Protocol (RSTP) defined in IEEE standard 802.1w, and IEEE standard 802.1Q 2003 addressing the use of multiple spanning trees in virtual local area network (VLAN) bridges in accordance with the Multiple Spanning Tree Protocol (MSPT) defined in IEEE standard 802.1s, each of which is hereby incorporated by reference herein.

In accordance with the RSTP, the bridges 101-120 are adapted to exchange BPDUs protocol data unit (BPDUs) messages for purposes of determining which of the plurality of bridges is to serve as the root bridge among as well as the role of each port of every bridge. To determine the root bridge and the applicable port roles, the bridges exchange BPDU messages with priority information referred to as message priority vectors (MPVs). A bridge generally transmits BPDUs at a regular interval given by a bridge Hello time timer value, i.e., a Hello time, set forth in the RSTP standard or sends the BPDUs when a change in the spanning tree topology is initiated. A MPV has the following structure: <Root_Id, Root_Path_Cost, Designated_Bridge_ID, Designated_Port_ID, Port ID>, each of the components of the vector being well understood by those skilled in the art. Upon receipt of a BPDU, a bridge port compares the received MPV with its own priority vector referred to as a port priority vector (PPV). If the received MPV is "superior" to the PPV, i.e., numerically lower, the port's state machine computes the role of each port of every bridge, which may confirm the existing spanning tree topology or, if necessary, initiate a spanning tree topology change.

The Root bridge in the spanned tree is generally the bridge with the lowest bridge ID (BID), i.e., the lowest MAC address, and resides at the head of the spanning tree. Although, every bridge initially considers itself the root bridge, each bridge learns the identity of the bridge with the lowest BID through the exchange of BPDUs. In determining the role of the ports of the plurality of bridges, each of the ports is classified as either a root port, a designated port, a backup port, or an alternate Port. With the exception of the root bridge, every bridge has one root port, namely the port of the bridge that provides the lowest cost path to the Root Bridge. A Designated port is an interface used to send and receive frames on a specific network segment. Although the designated port may be one of a plurality ports accessible to the specific network segment, the Designated port is determined based upon the lowest root cost path. The Alternate and Backup ports provide connectivity if other network components fail. An Alternate port offers an additional path to the Root bridge beyond the path provided by a bridge's own Root port. A Backup port offers an additional path to the leaves of the spanning tree beyond the path provided by the Designated port for the network segment.

The ports of a bridge may also be characterized by one or more of a plurality of states, namely a Forwarding state, a Discarding state, and a Learning state, each of which is set forth in the 802.1D 2004 standard. In the Learning state, the port temporarily learns the identities of nodes reachable through the port but does not forward frames. In the Forwarding state, which generally follows the learning state, the bridge forwards frames in accordance with a filtering database. In the Discarding state, all traffic is dropped with the exception of control traffic at Layer 2 of the Open Systems Interconnect (OSI) reference model.

Figure 2:
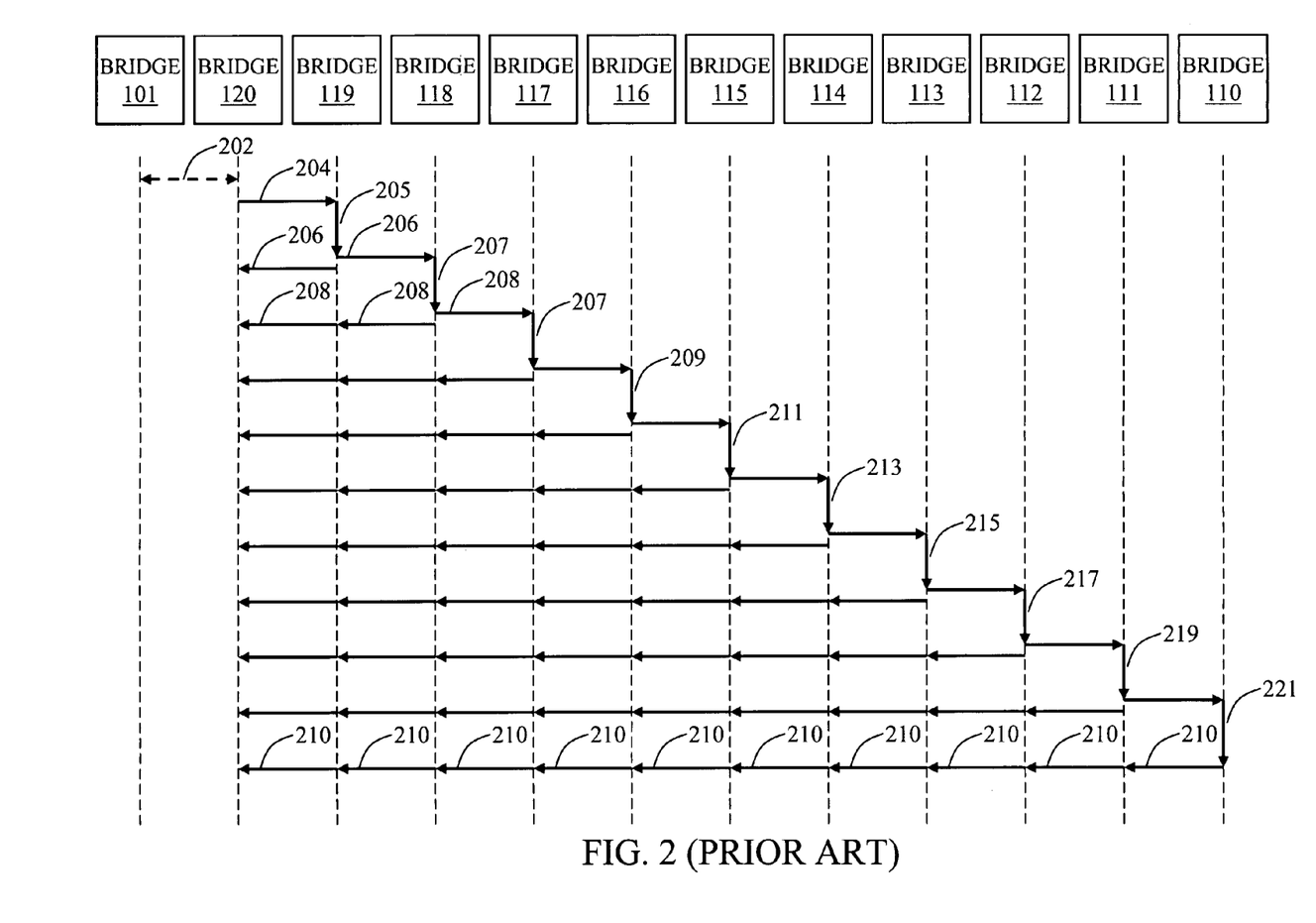
FIG. 2 is an RSTP message exchange between the bridges of the data communications network, in accordance with the prior art.

Illustrated in FIG. 2 is a message diagram representing a BPDU traffic burst in the communications network 100 of FIG. 1 as a result of a link failure. The term "traffic burst" as used herein refers to situations in which a bridge enabled with RSTP simultaneously transmits a plurality of BPDUs on one or more of its ports at the same time upon receipt of a BPDU with "superior information" on any port. "Superior Information" as used herein is defined in the 802.1D 2004 standard paragraph 17.6 entitled "Priority vector calculations." The BPDU traffic burst of FIG. 1 represents a worst case scenario that could occur under the circumstances stated below. As a consequence of a BPDU traffic burst, the convergence of the spanning tree may be delayed.

For purposes of this example, bridge 111 has the lowest MAC address of the set of bridges 111-120 on the left side of the network 100, the bridges 112-119 have consecutively higher MAC addresses starting from bridge 112, and bridge 119 has the highest MAC address. The MAC addresses of the bridges 102-110 on the right side of the network 100 are not relevant to this discussion below. Assuming that the communications links—including link 130A—are active, the first port 111A of the bridge 111 may serve as a Root bridge while the second port 111B may serve as an Alternate port 111B. In addition, the bridges 101-120 are configured with the RSTP default values including a migrate time of 3 seconds, a bridge hello time of 2 seconds, a bridge max age of 20 seconds, a bridge forward delay of 15 seconds and a transmit hold count of 6.

Bridge 112 includes a designated port 112A for transmitting frames to the adjacent local area network (LAN) segment while bridge 111 includes an alternate port 111 providing an alternate path from the intermediate LAN segment to the root bridge.

For purposes of the following example, it is assumed that the bridge 101 is the Root bridge, bridge 102 is designated bridge for purposes of bridges 103-111, and bridge 120 is designated bridge with respect to bridges 112-119. If the communication link 130A between the bridge 120 and the root bridge 101 fails and the exchange of data terminated 202, the bridges exchange BPDUs to re-establish the appropriate propagation path in accordance with the RSTP protocol. After the failure of link 130A and the restructure of the spanning tree, all frames transmitted to the plurality of bridges 102-120 will be transmitted through the bridge 102.

Upon detection of the link failure, port 120B of bridge 120 is reclassified from a Root port to a disabled port and all root port information purged. In the absence knowledge of the root bridge 101 or the path thereto, bridge 120 believes it to be the root bridge and sends a BPDU 204 to bridge 119 announcing that bridge 120 is the new root bridge. Upon receipt of the BPDU 204 from bridge 120, bridge 119 discards its root port information and the bridge port 119B compares the received MPV with its own PPV vector. When bridge 119 determines that it has better vector, bridge 119 immediately transmits BPDUs 206 from each of its ports announcing that bridge 119 is the new root bridge. Although port 120A of bridge 120 transitions to a designated port, bridge 118 compares 207 the received MPV from bridge 119 with its own PPV vector. When bridge 118 determines that it has a superior priority vector, bridge 120 immediately transmits BPDUs 208 to its neighbors announcing that bridge 118 is the new root bridge. Port 119A of bridge 119 transitions to the designated port state and the BPDU 208 forwarded to the bridge 120.

The pattern described above is repeated many times over with each bridge from bridge 117 to bridge 111 receiving a BPDU announcing that the transmitting bridge is the root bridge. Each time, the bridge must compare 209-215 the received priority vector with the local PPV and immediately respond with a new BPDU identifying itself as the root bridge. At each step, the BPDUs are transmitted to downstream bridges all the way to bridge 120, thereby giving rise to a significant BPDU traffic burst. The burst only subsides only after the alternate port 111B of bridge 111 transmits a BPDU 210 identifying bridge 101 as the true root bridge. This BPDU identifying the proper root bridge is propagated to each of the bridges 112-120 and each bridge updates its root port information. As one skilled in the art will appreciate, proposal/agreement BPDUs (not shown) may continue to propagate through the network 100 in accordance with the RSTP protocol. As can be seen, the bridge 120 adjacent to the failed link 130A receives ten BPDUs in the BPDU traffic burst. In general, the minimum burst size experienced by a bridge is equal to the number of bridges between the root bridge 101 and the alternate bridge 111 in the direction of the failure.

The first version of Spanning Tree in the legacy 802.1D 1998 standard introduced a burst limiter to inhibit BPDU traffic burst like that described above. A port compliant with the RSTP standard keeps track of the number of BPDUs sent with a standard variable referred to as the "txCount," which is incremented each time a BPDU is transmitted. A BPDU is not transmitted if the txCount reaches a given maximum called txHoldCount. The txCount number is also automatically decremented each second, thereby allowing the BPDU transmissions to resume at a later time. As such, a port is permitted to burst as quickly as possible until the txHoldCount is reached, and then transmit one BPDU maximum per second thereafter as long as txCount remains greater than or equal to txHoldCount.

Currently, the txHoldCount is permitted to range from one to ten, with a default value set to six. Since the number of BPDU that may be transmitted is correlated to number of nodes in the network, a relatively larger network increases the chances of one or more bridges reaching such a threshold. As a result, the time required for convergence can be delayed between one to several seconds as a function of the frequency with which the burst limiter is triggered. There is therefore a need for a system and method to restrict the number of BPDUs transmitted while enabling the network to converge as quickly as possible without undue delay resulting from the RSTP burst limiter.

SUMMARY

The invention in the preferred embodiment features a system and method for controlling bridge protocol data unit bursts in a data communications network comprising a plurality of bridges or like devices. The switching device preferably comprises a first port enabled with a link management protocol as well as a burst control state machine. The burst control state machine is adapted to receive a first BPDU from a bridge reachable through the port and, under certain conditions, delay the transmission of a second BPDU advertising that the switching device is the new root bridge when, in fact, it is not. The delay is preferably long enough to enable another bridge, either the root bridge or designated bridge, to transmit the identity of the true root bridge. The delay, e.g., a burst control delay, is preferably equal to or less than a Hello time timer value generally defined to be 2 seconds in the RSTP standard. In the preferred embodiment, the conditions include the following: the first port is a Root port in the Forwarding state; the first port transitions from a Root port to a Designated port in response to the first BPDU. The conditions may further include the following: forwarding information associated with the first port is current, i.e., infoIs=RECEIVED; and a topology change indicator received with the first BPDU is false, i.e., proposing is equal to FALSE.

BRIEF DESCRIPTION OF THE DRAWINGS

The present invention is illustrated by way of example and not limitation in the figures of the accompanying drawings, and in which:

FIG. 7 is an UPDATE_BURST_AVOD state implemented in the Burst Control Port State Machine, in accordance with the preferred embodiment of the present invention;

DETAILED DESCRIPTION OF THE PREFERRED EMBODIMENT

Figure 3:
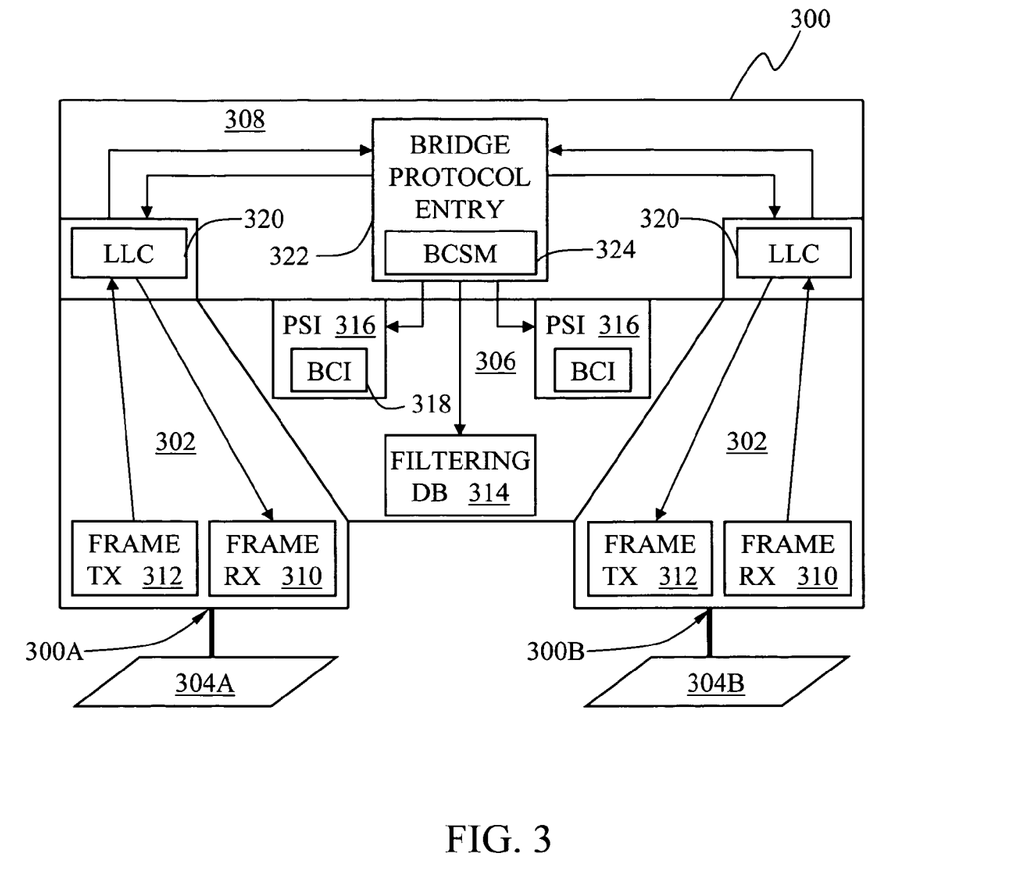
FIG. 3 is a Burst Control (BC) switch adapted to perform link management burst control, in accordance with the preferred embodiment of the present invention.

Illustrated in FIG. 3 is a switching device adapted to perform link management burst control in accordance with the preferred embodiment. In the preferred embodiment, the switching device is a bridge 300 although the invention is equally applicable to routers and multilayer switches adapted to provide forwarding and routing operations at Layers 2 and 3 of the Open Systems Interconnection (OSI) reference model. The switch 300 in the preferred embodiment includes a plurality of Layer 2 interfaces represented by MAC entities 302, a MAC relay entity 306, and higher layer entities 308. Each of the MAC entities 302 includes a frame receiver 310 and frame transmitter 312 operably coupled to a local area network (LAN) 304A-304B via an external port 300A-300B, respectively.

The MAC entity 302 handles all Media Access Method Dependent Functions (MAC protocol and procedures) in accordance with the RSTP standard including the inspection of all frames received on the attached LAN and transmission of frames received from the MAC relay entity 306 and higher layer entities 308. The MAC relay entity 306 interconnects the plurality of ports 304A-304B and handles the Media Access Method Independent Functions of relaying frames between Bridge Ports including filtering frames and source learning. The MAC relay entity 306 includes a filtering database 314 and a plurality of port state information (PSI) tables 316. The filtering database 314 retains filtering information including known forwarding address and applicable ports 304A-304B to which received frames may be forwarded. The PSI table 316 associated with a port includes a record of the learning and forwarding states of the port, i.e., whether the port is currently in the disabled, blocking, listening, learning, forwarding state. In the preferred embodiment, the PSI table 316 also maintains a record of burst control information (BCI) 318 including "burstAvoidanceControl" and "burstAvoid" parameters described in more detail below.

The higher layer entities 308 include logical link control (LLC) entities 320 and a bridge protocol entity 322. The LLC entities 320 encompasses both the Link Layer capabilities—which include demultiplexing, for example—provided by LLC as specified in International Organization for standards (ISO)/International Electrotechnical Commission (IEC) 8802-2 as well as the Type interpretation of the Length/Type field specified in IEEE Std 802.3. The bridge protocol entity 322 maintains a plurality of RSTP state machines including a Port Information State Machine (PISM) adapted to execute the burst avoidance protocol, and maintains RSTP protocol parameters and configuration timers. The PISM is defined in the RSTP standard and for replying to Configuration BPDUs and responding to Transmit Topology Change Notification (TCN) BPDUs. In the preferred embodiment, the enhanced PISM includes a Burst Control State Machine (BCSM) 324 that modifies the timing of topology changes notifications BPDUs to prevent potentially injurious BPDU traffic bursts.

In the preferred embodiment, the BCSM 324 is an improvement upon the PISM set forth in the RSTP standard hereby incorporated herein by reference. In particular, the BCSM 324 causes the switching device 300 to test for various conditions upon receipt of a TCN BPDU at a designated port and, if those conditions are met, the device 300 induces a delay in the transmission of configuration BPDUs from the same designated port. The induced delay, referred to as a burstAvoidDelay, prevents the particular switching device from transmitting a configuration BPDU identifying its own superior priority vector from the switching device before a configuration BPDU is received from the root bridge or an alternate port. In this manner, the switching device suppresses the transmission of one or more BPDUs identifying itself as the root before the identity of the true root bridge is advertised by the root bridge or the alternate port. Depending on the topology of the network and the MAC addresses of the bridges in the network, the preferred embodiment may significantly reduce the number of BPDUs transmitted and therefore potentially reduce the time required to determine the proper spanning tree topology.

Each of the bridge ports of switching module 300 is adapted to invoke the burst avoidance process in response to the receipt of a BPDU under the proper conditions. In the preferred embodiment, the burst avoidance process may be invoked by a port upon receipt of a BPDU if: (a) the receiving port is a root port in the forwarding state that is transitioning to the designated role as part of a topology change, and (b) the port has received current (not aged out) information from the Designated bridge, i.e, infoIs has the "received" value. However, the burst avoidance process may not be invoked while any port of a bridge is attempting to propagate a topology change notification through the network, i.e., the tcProp should not be set, and may not be invoked if the port from which the BPDU is received is attempting to become a designated bridge, i.e., the proposal flag of the received BPDU should not be set. Under the preceding conditions, the switch 300 of the preferred embodiment is adapted to delay the time to transmit a BPDU in the direction of the link failure by suppressing the time at which the newInfo is set. That is, the newInfo, which is a boolean variable used to signal when a BPDU with changed topology information is to be transmitted, is not set TRUE in accordance with the PSIM of the prior art. Instead, the switch 300 sets the newInfo to TRUE after a period of time not to exceed a burstAvoidDelay, the burstAvoidDelay not to exceed the Hello time. Assuming the Hello time is set to a default value of two seconds, the BC switch 300 may delay the transmission of the BPDU by as much as two seconds.

Figure 4:
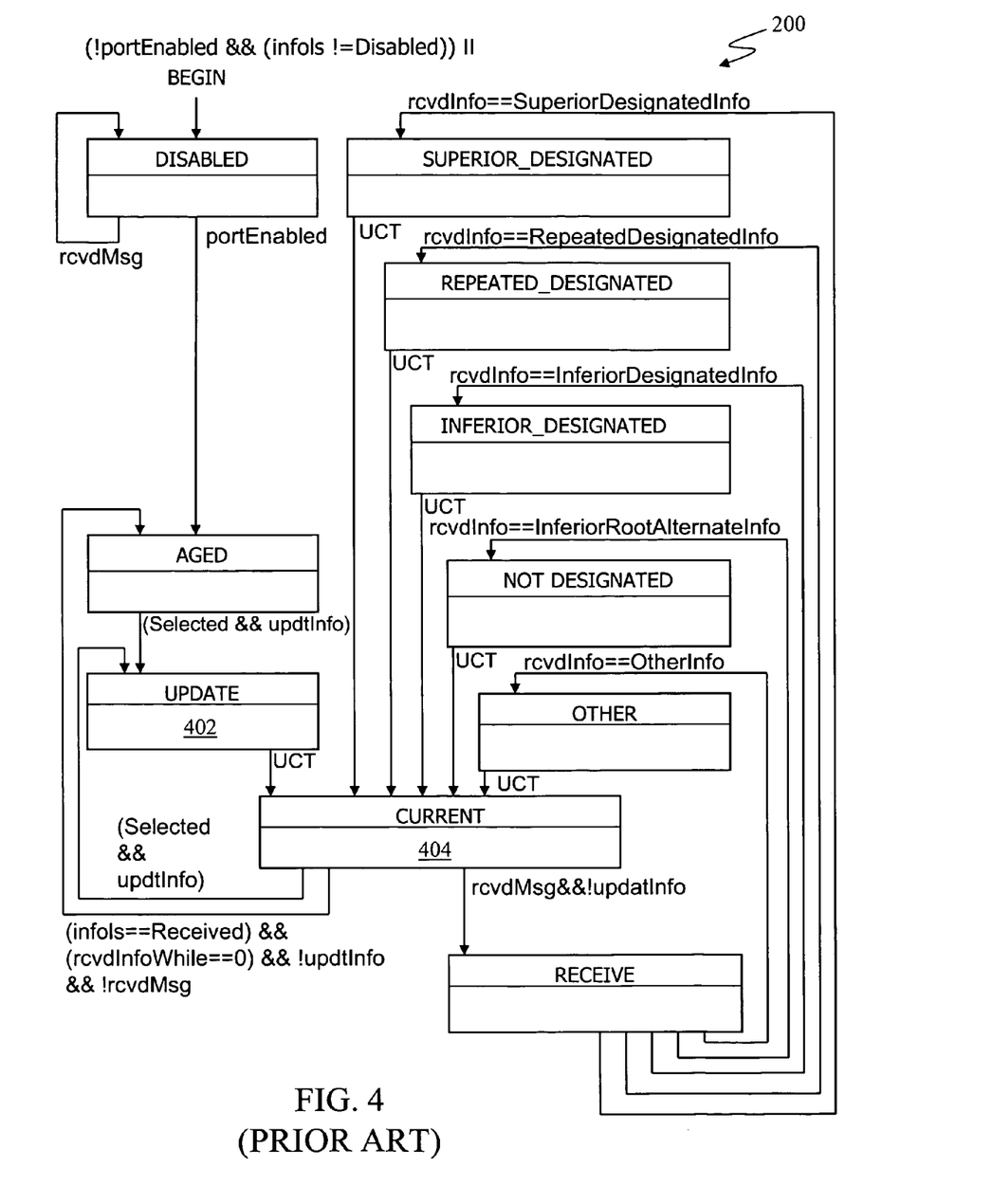
FIG. 4 is the Port State Information Machine of a prior art bridge enabled with the RSTP.
Figure 5:
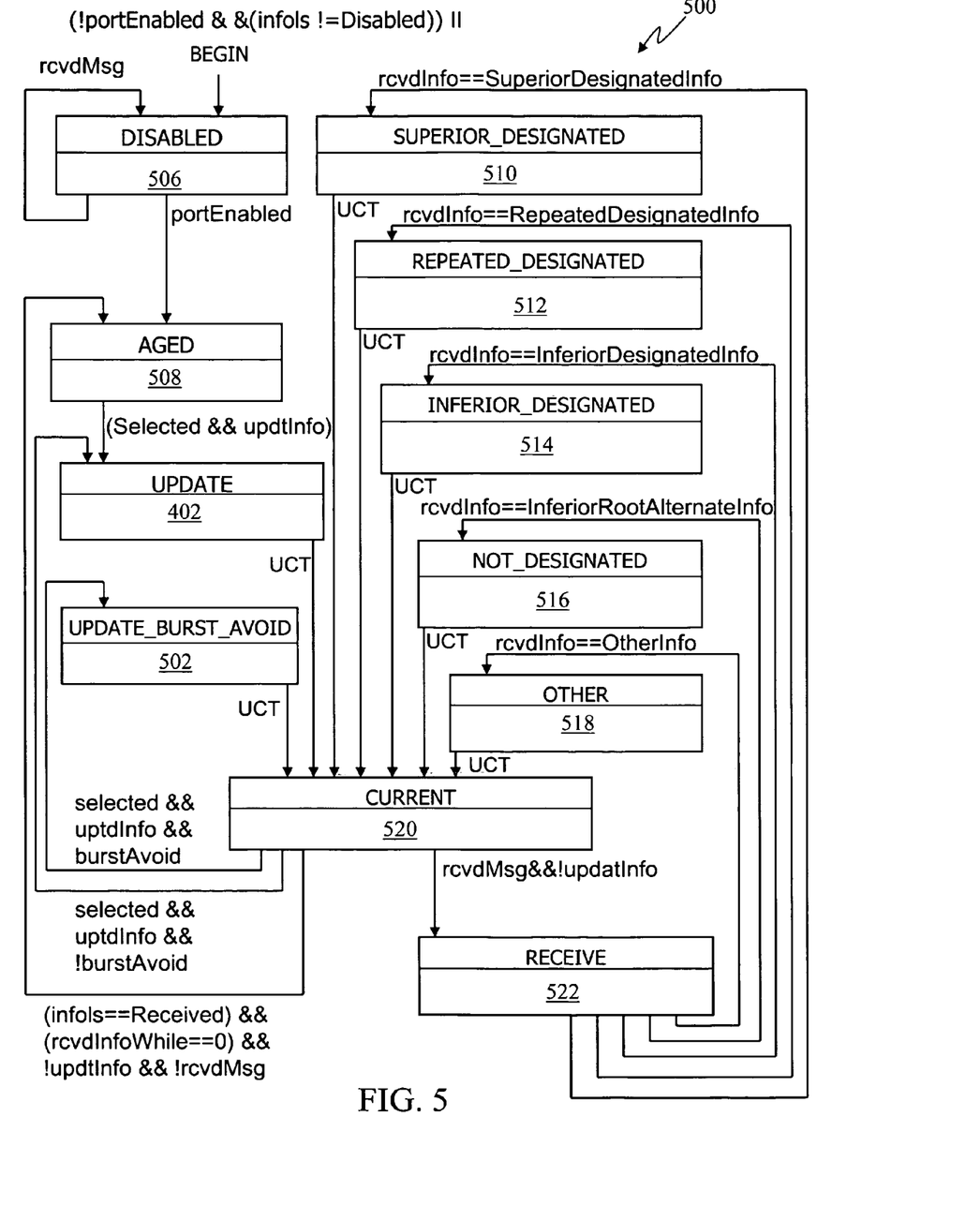
FIG. 5 is the Burst Control State Machine of the BC switch, in accordance with the preferred embodiment of the present invention.

In some embodiments, the bust control processing of the preferred embodiment is implemented as an improvement to the Port Information State Machine (PISM) illustrated in FIG. 4, particularly the functionality associated with UPDATE state 402 as well as the conditions associated with the transition from the CURRENT state 404 to the UPDATE state 402. The improved PISM is referred to herein as the Burst Control State Machine (BCSM) 500, which is illustrated in FIG. 5.

The BCSM 500 in the preferred embodiment includes two update states for state variables associated with the transmission of BPDUs from the BC switch 300, namely an the UPDATE state 402 consistent with the RSTP standard as well as an UPDATE_BURST_AVOIDANCE state 502. The UPDATE_BURST_AVOIDANCE state 502 and the UPDATE state 402 represent alternative states, i.e., only one of the two being implemented at any given time. Which of the two states being implemented is dictated a burstAvoid parameter whose value is determined as a function of the burst control conditions discussed above. The BCSM 500 in the preferred embodiment further includes the following: DISABLED state 506, AGED state 508, SUPERIOR_DESIGNATED state 510, REPEATED_DESIGNATED state 512, INTERIOR_DESIGNATED state 514, NOT_DESIGNATED state 516, OTHER state 518, CURRENT state 520, and RECEIVE state 522. The states 506, 508, 510, 512, 514, 516, 518, 520, 522 are defined in the RSTP standard and are well understood by those skilled in the art.

Figure 6:
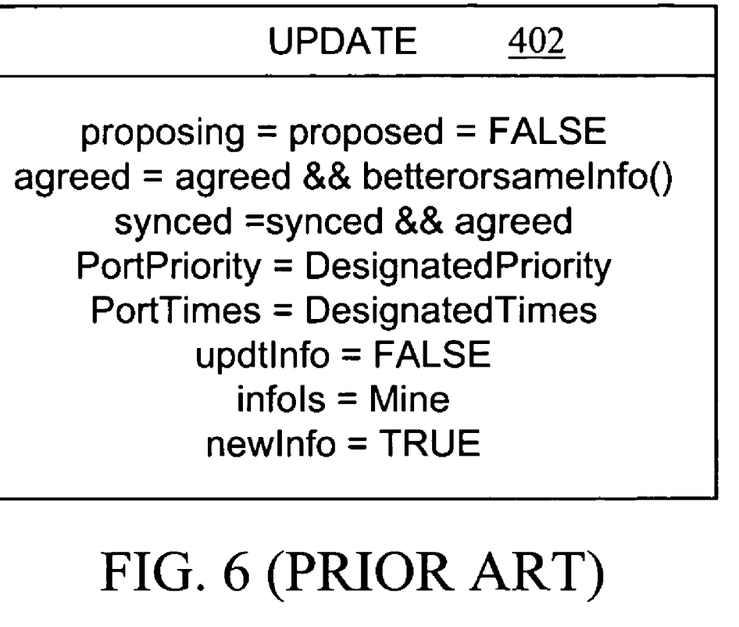
FIG. 6 is the Update state of the Port State Information Machine of the prior art.

The UPDATE state 402 illustrated in FIG. 6 employed in the present invention (see FIG. 5) is substantially the same as the UPDATE state of the prior art PISM (see FIG. 4). In particular, the BCSM 500 in the UPDATE state 402 is adapted to define or redefine the following system parameters set forth in the RSTP standard: proposing=proposed=FALSE; agreed=agreed && betterorsameInfo( ) where betterorsameInfo( ) is TRUE or FALSE depending on the value of the function argument, the infoIs value, and whether the MPV is better or the same as the PPV; synced=synced && agreed; PortPriority=DesignatedPriority; PortTimes=DesignatedTimes; updtInfo=FALSE; infoIs=Mine; and newInfo=TRUE, each of these system parameters and functions being defined in the RSTP standard.

In contrast to the prior art, the BCSM 500 is adapted to transition from the CURRENT state 520 to the UPDATE state 402 if the selected && uptdInfo && !burstAvoid evaluate to TRUE. While the selected && uptdInfo are defined in the prior art, burstAvoid is a new parameter introduced to regulate which of the two update states is to be executed. In the preferred embodiment, burstAvoid is false unless the burst control conditions discussed below are satisfied, that is:

```
If (burstAvoidanceControl) {
    If (infoIs == RECEIVED) {
        If (selectedRole == DESIGNATED) {
            If ((role == ROOT) && (state == FORWARDING)) {
                If (proposing == FALSE) {
                    If (tcProp == FALSE) {
                        burstAvoid = true; }}}}}}
``` where burstAvoidanceControl is a user-defined parameter set equal to TRUE to configure burst control in the preferred embodiment, or set equal to FALSE if burst control is to be disabled. The default value of the burstAvoidanceControl is TRUE in the preferred embodiment, and the default value of burstAvoidanceControl is FALSE signifying that the instant protocol has not been activated by default.

Figure 7:
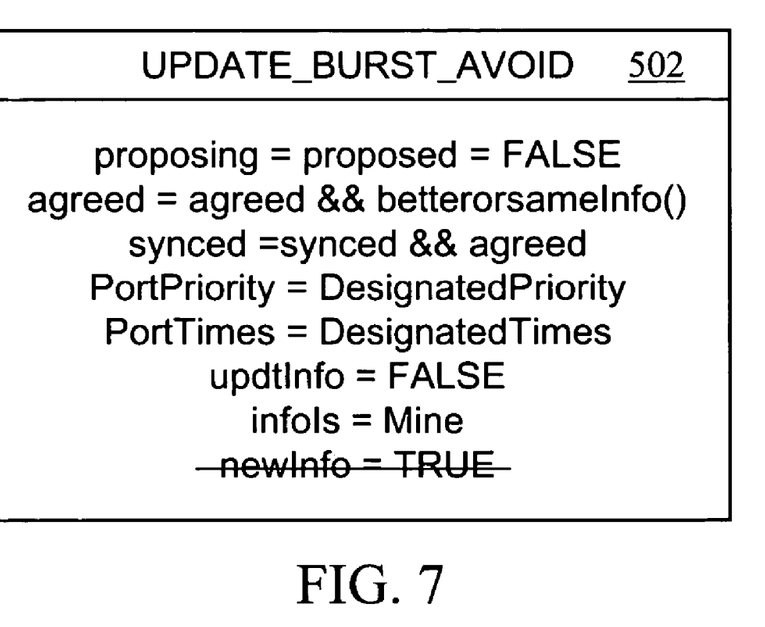
FIG. 7 is an UPDATE_BURST_AVOID state implemented in the Burst Control Port State Machine, in accordance with the preferred embodiment of the present invention.

In the alternative to the prior art UPDATE state 402, the preferred embodiment is enabled to invoke the UPDATE_BURST_AVOIDANCE state 502 if selected && uptdInfo && burstAvoid evaluate to TRUE. As illustrated in FIG. 7, the UPDATE_BURST_AVOIDANCE state 502 is adapted to define or redefine the following system parameters set forth in the RSTP standard: proposing=proposed=FALSE; agreed=agreed && betterorsameInfo( ) where betterorsameInfo( ) is TRUE or FALSE depending on the value of the function argument, the infoIs value, and whether the MPV is better or the same as the PPV; synced=synced && agreed; PortPriority=DesignatedPriority; PortTimes=DesignatedTimes; updtInfo=FALSE; and infoIs=Mine. In contrast to the UPDATE state 402 of the prior art, the BCSM 500 does not set newInfo=TRUE, thereby preventing the BCSM 500 from immediately transmitting a BPDU in the direction of the link failure. As a consequence, any BPDU transmitted from the associated port is delay a maximum of two seconds in accordance with the Hello time.

Figure 8:
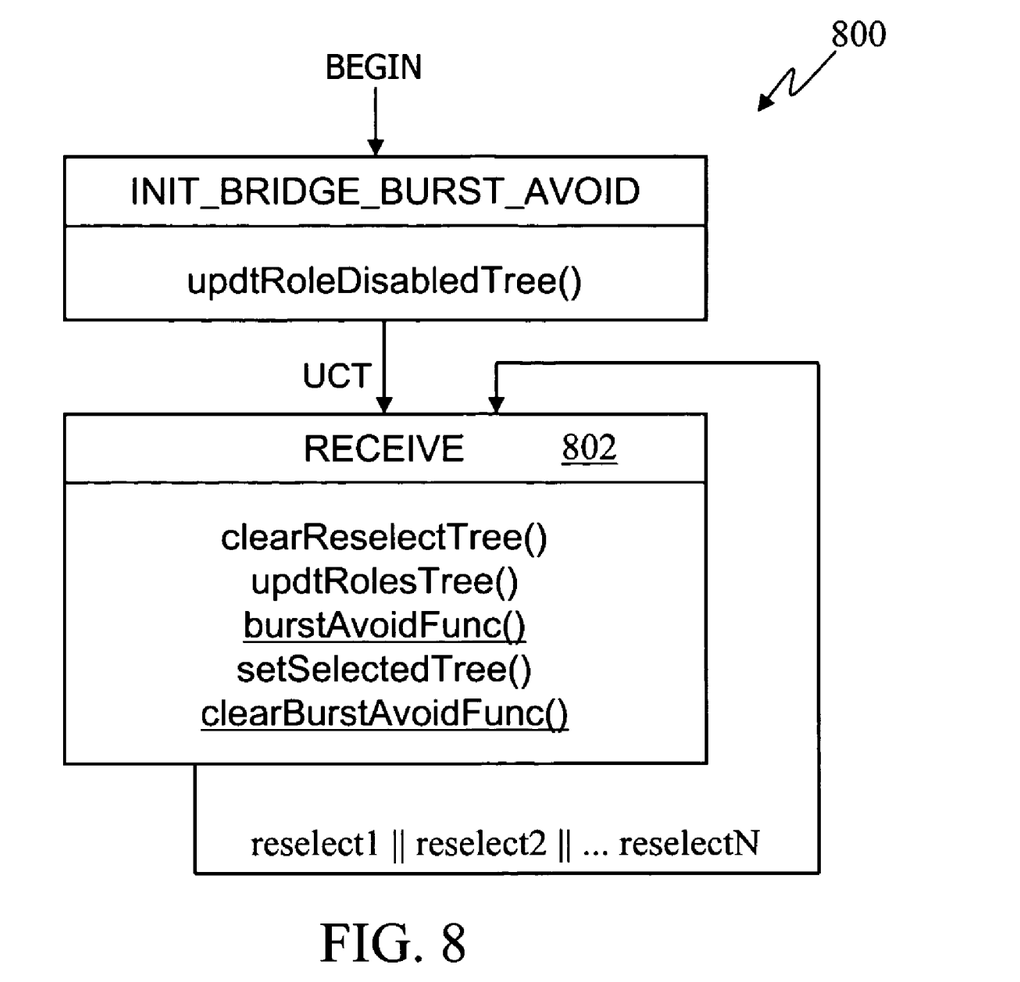
FIG. 8 is a Port Role Selection State Machine implemented in the Burst Control Port State Machine, in accordance with the preferred embodiment of the present invention.

As one skilled in the art will appreciate, burstAvoid is a port parameter, defined with respect to each switch port, authorizing the burst avoidance protocol to be activated on the associated port. The burstAvoid parameter may be initially set to FALSE in the DISABLED state 506 of the BCSM 500 which is otherwise identical to the Port Information State Machine illustrated in FIG. 4. The value of burstAvoid may be set to TRUE, if applicable, in a function referred to herein as burstAvoidFunc( ) invoked in the RECEIVE state 802 of Port Role Selection state machine set forth in the RSTP standard. As illustrated in Port Role Selection state machine 800 of FIG. 8, the burstAvoidFunc( ) is perferably executed concurrently with the clearReselectTree( ), the updtRolesTree( ), and the setSelectedTree( ) functions. The burstAvoid parameter may be set back to FALSE, if applicable, in a function referred to herein as clearBurstAvoidFunc( ) upon conclusion of the RECEIVE state 802. As stated above, the burstAvoidFunc( ) procedure is performed on the port that receives the incoming BPDU if the received BPDU does not contain TC flag set or a proposal flag set, while the clearburstAvoidFunc( ) procedure clears all burstAvoid parameters on each of the plurality of ports of the BC switch 300.

As the burst avoidance protocol of the preferred embodiment is activated, the fact that the newInfo parameter is not set immediately means that the BPDU is delayed utmost of two seconds in accordance with the hello timer. The fact that proposing is not set on the port that has received the BPDU also means that the protocol applies only if there is no Alternate port on that bridge. An Alternate port, which is becoming Root port, triggers REROOT, meaning that any Recent Root port must become Discarding and needs to send a proposal immediately to become Designated Forwarding again. Also if tcProp is set on the port that receives the BPDU, TC BPDUs should be sent from the port and the burst avoidance protocol not activated.

In the preferred embodiment, a two seconds delay is not induced in the complete spanning tree computation. The actual delay, referred to as the burstAvoiddelay, is preferably the delay associated with the elapse time necessary for the TC BPDU to propagate to the alternate bridge 111 and for the alternate bridge to send a BPDU back to the bridge that initially detected the failure and believed itself to be the new Root bridge.

One skilled in the art will appreciate that the BCSM 500 of the preferred embodiment is backward compatible, i.e., the burst avoidance protocol applies on an RSTP port even if that RSTP port is facing an conventional spanning tree protocol (STP) port.

Figure 9:
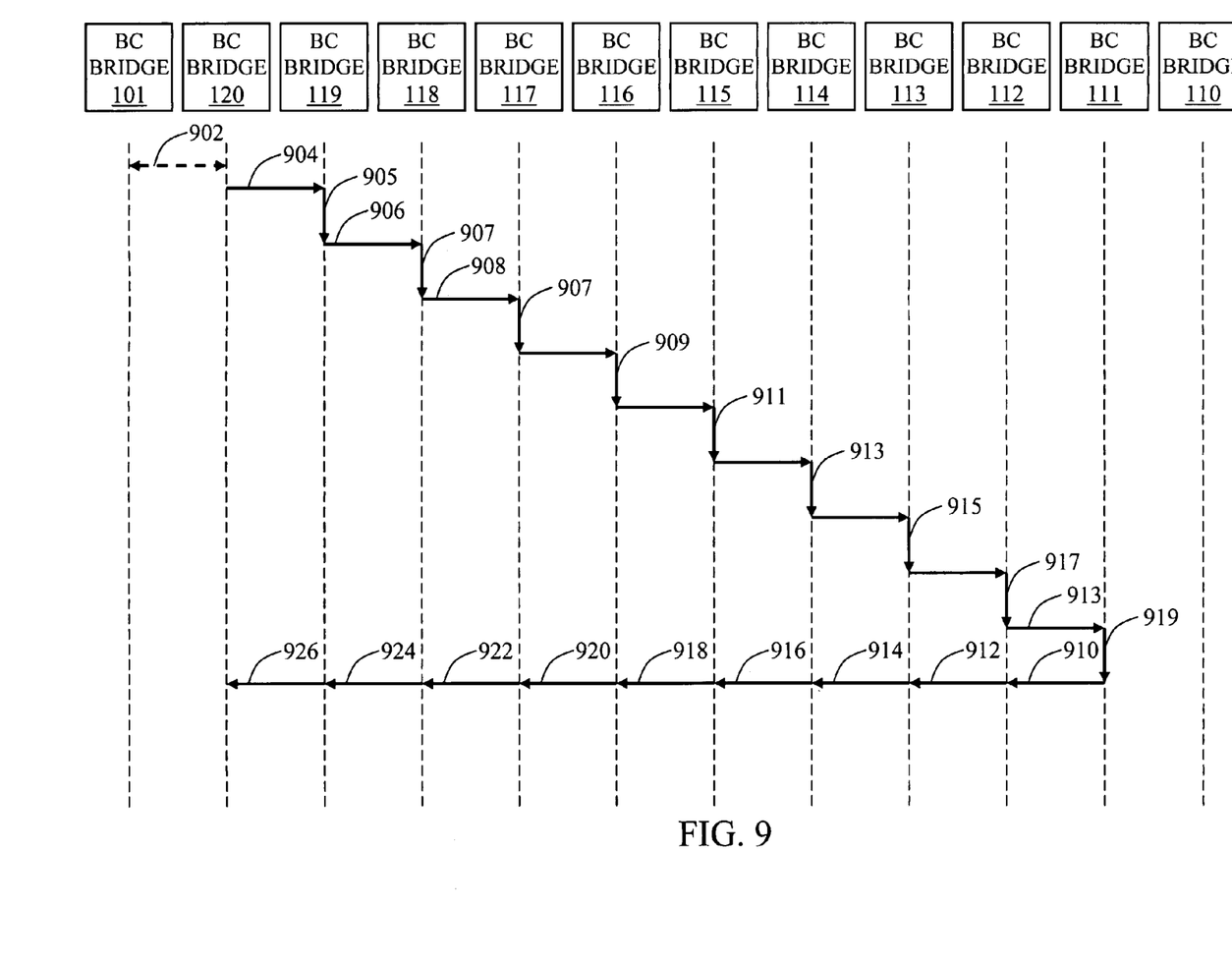
FIG. 9 is an RSTP message exchange between the BC bridges of the data communications network of FIG. 1, in accordance with the preferred embodiment of the present invention.

Illustrated in FIG. 9 is an RSTP message exchange between the BC bridges of a data communications network. For convenience, the RSTP message exchange represented corresponds to a data communications network 100 having the ring topology illustrated in FIG. 1, where each of the bridges 100-120 is a burst control switch adapted to execute the burst avoidance protocol of the preferred embodiment. As with the previous example described above, failure of any of the communications links with the root bridge 101 breaks an active transmission path in the spanning tree. If and when the communications link 130A fails—indicated by the dashed line 902—BC bridge 120 losses its root bridge and initiates a topology change to re-establish a spanning tree within the BC bridges 100-120. The BC bridge 120 immediately sends a BPDU 904 declaring that it is the new root bridge from port 120A.

Upon receipt of the BPDU 904, BC bridge 119 compares 905 the MPV with its own PPV and determines that it has a better priority vector than BC bridge 120. Port 119B of BC bridge 119 immediately transitions from a "Root Forwarding" to a "Designated Forwarding" port. Although BC bridge 119 proceeds to transmit a BPDU 906 declaring that bridge 119 is the new root bridge from port 119A, the bridge 119 refrains from transmitting a BPDU from port 119A if the burst control conditions discussed above apply. That is, port 119A withholds transmission of BPDU 206 sent in the prior art (see FIG. 2) assuming that: (a) port 119A was a Root port in the Forwarding state prior to the failure of communications link 130A, (b) port 119A would transition to the Designated role after the spanning tree topology converges, (c) the forwarding information at port 119B has not aged out, i.e., infoIs is equal to "received," (d) the tcProp flag of the received BPDU had not been set, (e) the proposal flag of the received BPDU had not been set, and (f) the user had enabled the burst avoidance protocol by setting burstAvoidanceControl equal to TRUE.

While scenario described immediately above gives rise to a temporary situation in which there are two "Designated Forwarding" ports face-to-face—namely port 120A of BC bridge 120 and port 119B of BC bridge 6—one skilled in the art will appreciate that there is no detrimental impact on forwarding operations since those two ports were already in the Forwarding state before.

Upon receipt of the BPDU 906, BC bridge 118 compares 907 the received MPV with its own PPV, determines that it has a better priority vector than BC bridge 119, transitions from a "Root Forwarding" port to a "Designated Forwarding" port, transmit a BPDU 908 declaring that bridge 118 is the new root bridge, and withholds transmitting a BPDU to BC bridge 119 advertising that it is the new root bridge. Similar, each of the BC bridges 117-112 conducts the priority vector comparison 907, 909, 911, 913, 915, 917 upon receipt of the a BPDU on the interface in the direction of the link failure 902, determines that it has a superior priority vector, and forwards a BPDU advertising it is the new root bridge. The sequence of BPDUs transmitted away from the link failure continues until a BPDU 913 from BC bridge 112 is received by the alternate port 111B of BC bridge 111.

Upon recognition 919 of its superior priority vector, port 111B of BC bridge 111 attempts transition to a Designated role and Forwarding state, i.e., a "Designated Forwarding" port. As such, BC bridge 111 transmits a "proposal" BPDU 910 to BC bridge 112. Port 112A of BC bridge 112—which is currently a "Designated Forwarding" port—immediately assumes a Root role and Forwarding state, i.e., a "Root Forwarding" port. In accordance with RSTP standard, BC bridge 112 sends a "proposal" BPDU 912 to BC bridge 113, and each of the successive BC bridges 113-120 forwards a "proposal" BPDU 916, 918, 920, 924, 926 until the "proposal" BPDU is received by the last BC bridge 120. The receiving port of each of the BC bridges 113-120 from a "Designated Forwarding" port to a "Root Forwarding." One skilled in the art will appreciate that BC bridges 112-120 generally respond to the "proposal" BPDUs with "agreement" BPDUs (not shown) in accordance with the RSTP standard.

The spanning tree has converged upon receipt of the "proposal" BPDU 926 at BC bridge 120 and transmission of the associated "agreement" BPDU from BC bridge 120. As one skilled in the art will appreciate, the final spanning tree topology is reached without the excessive number of BPDUs exchanged in the exemplary situation illustrated in FIG. 2. For example, the number of BPDUs transmitted to port 120B of BC bridge 120 is one, in contrast to the eleven BPDUs transmitted to port 120B of the prior art bridge 120 discussed in reference to FIG. 2 above. In addition to the reduced bandwidth requirements, the preferred embodiment of the present invention also significantly reduces the chance of any bridge reaching the burst limiter, i.e., txHoldCount, thereby reducing the delay necessary for the spanning tree to converge in a single failure scenario like that discussed above.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A switching device adapted to perform burst control in a data communications network comprising a plurality of bridges, the switching device comprising:
    a first port enabled with a link management protocol; and
    a burst control state machine configured to:
        receive, on the first port, a first bridge protocol data unit (BPDU) from a first bridge of the plurality of bridges;
        not respond with its own BPDU falsely indicating itself as a new root bridge; and
        transmit, in response to the first BPDU, a second BPDU from the first port a predetermined period of time after the first BPDU, the predetermined period of time long enough to enable the first bridge to identify a new root bridge.

2. The switching device of claim 1, wherein the predetermined period of time is a burst avoidance delay less than or equal to two seconds.

3. The switching device of claim 1, wherein the predetermined period of time is less than or equal to a Hello time in accordance with the link management protocol.

4. The switching device of claim 1, wherein a set of conditions related to the transmit step further comprises: forwarding information associated with the first port is current; and a topology change indicator is false.

5. The switching device of claim 4, wherein the set of conditions further comprises: the first bridge is not attempting to become a Designated bridge.

6. The switching device of claim 1, wherein a port role of the first port transitions from Root to Designated if selectedRole is equal to DESIGNATED.

7. The switching device of claim 4, wherein the forwarding information associated with the first port is current if infols is equal to RECEIVED, and the topology change indicator is false if tcProp is equal to FALSE.

8. The switching device of claim 4, wherein the first bridge is not attempting to become a Designated bridge if proposing is equal to FALSE.

9. The switching device of claim 1, wherein the link management protocol is selected from the group consisting of: Spanning Tree Protocol, International Electrical and Electronics Engineers (IEEE) standard 802.1D 2004, Rapid Spanning Tree Protocol, IEEE standard 802.1w, Multiple Spanning Tree Protocol, IEEE standard 802.1Q 2003, IEEE standard 802.1s.

10. The switching device of claim 1, wherein the a burst control state machine is further adapted, if the set of conditions are satisfied, to automatically transmit the second BPDU from the first port after the first BPDU is received and to transmit the second BPDU from the first port the predetermined period of time after the first BPDU is received based on a burst avoidance control variable.

11. The switching device of claim 10, wherein the burst avoidance control variable is a user-defined value.

12. A method of controlling bridge protocol data unit (BPDU) bursts in a switching device in a data communications network comprising a plurality of bridges, the switching device comprising:
    receiving, on the first port enabled with a link management protocol, a first bridge protocol data unit (BPDU) from a first bridge of the plurality of bridges;
    not responding with its own BPDU falsely indicating itself as a new root bridge; and transmitting, a predetermined period of time after the first BPDU is received, a second BPDU from the first port, the predetermined period of time long enough to enable the first bridge to identify a new root bridge.

13. The method of claim 12, wherein the predetermined period of time is a burst avoidance delay less than or equal to two seconds.

14. The method of claim 12, wherein the predetermined period of time is less than or equal to a Hello time in accordance with the link management protocol.

* * * * *